(12) United States Patent
Shevchenko et al.

(10) Patent No.: US 11,468,227 B1
(45) Date of Patent: Oct. 11, 2022

(54) INFERRED EVENT DETECTION AND TEXT PROCESSING USING TRANSPARENT WINDOWS

(71) Applicant: Grammarly, Inc., San Francisco, CA (US)

(72) Inventors: Oleksiy Shevchenko, Vancouver (CA); Victor Pavlychko, Kyiv (UA); Valentyn Gaidylo, Kyiv (UA); Nikita Volobuiev, Kyiv (UA); Ievgen Rysai, Kyiv (UA); Roman Guliak, New York, NY (US); Yura Tanskiy, San Francisco, CA (US)

(73) Assignee: GRAMMARLY, INC., San Francisco, CA (US)

( * ) Notice: Subject to any disclaimer, the term of this patent is extended or adjusted under 35 U.S.C. 154(b) by 0 days.

(21) Appl. No.: 17/525,740

(22) Filed: Nov. 12, 2021

(51) Int. Cl.
*G06F 40/166* (2020.01)
*G06F 40/58* (2020.01)
*G06F 40/289* (2020.01)
*G06F 3/0481* (2022.01)
*G06F 40/106* (2020.01)

(52) U.S. Cl.
CPC .......... *G06F 40/166* (2020.01); *G06F 40/289* (2020.01); *G06F 40/58* (2020.01); *G06F 3/0481* (2013.01); *G06F 40/106* (2020.01)

(58) Field of Classification Search
CPC ...... G06F 40/166; G06F 40/289; G06F 40/58; G06F 3/0481; G06F 40/106
See application file for complete search history.

(56) References Cited

U.S. PATENT DOCUMENTS

| | | | |
|---|---|---|---|
| 11,042,704 B1 * | 6/2021 | Ayyadurai | G06F 3/04886 |
| 2015/0127320 A1 * | 5/2015 | Seo | G06F 40/58 704/2 |
| 2017/0004184 A1 * | 1/2017 | Jain | G06F 16/35 704/2 |
| 2020/0026536 A1 * | 1/2020 | Li | G06F 9/454 |

\* cited by examiner

*Primary Examiner* — Keith D Bloomquist
(74) *Attorney, Agent, or Firm* — Baker Botts L.L.P.

(57) ABSTRACT

In one embodiment, the disclosure provides a computer-implemented or programmed method, comprising: causing subscribing to a plurality of events provided by a first application programming interface; receiving a layout change event pushed from the first application programming interface; determining that a change in focused element resulted in a currently focused element; receiving, from the currently focused element, a digital electronic object comprising a source text; programmatically dividing the source text into a plurality of source text units; programmatically evaluating each particular source text unit among the plurality of source text units using a machine learning model, and receiving a classification output from the machine learning model; programmatically transforming the classification output to yield an output set of phrase suggestions; and, causing displaying one or more phrase suggestions of the output set of phrase suggestions.

20 Claims, 7 Drawing Sheets

400

Causing executing, at a computer, first programmed instructions formatted to cause subscribing, by an application program executing on the computer, to a plurality of events provided by a first application programming interface. *402*

Programmatically receiving, by the application program, a layout change event pushed from the first application programming interface. *404*

Responsive to receiving the layout change event, determining, by the application program, that a change in focused element resulted in a currently focused element. *406*

Programmatically receiving, from the currently focused element, a digital electronic object comprising a source text. *408*

Programmatically dividing the source text into a plurality of source text units. *410*

Programmatically evaluating each particular source text unit among the plurality of source text units using a machine learning model, and receiving a classification output from the machine learning model that classifies each particular source text unit as a particular class of phrase among a plurality of possible classes of phrases. *412*

Programmatically transforming the classification output to yield an output set of phrase suggestions. *414*

Causing displaying, in a graphical user interface displayed on a device display of the computer, one or more phrase suggestions of the output set of phrase suggestions. *416*

```
┌─────────────────────────────────────────────────────────────────┐
│ Causing executing, at a computer, first programmed instructions │
│ formatted to cause subscribing, by an application program       │
│ executing on the computer, to a plurality of events provided by │
│ a first application programming interface. 462                  │
└─────────────────────────────────────────────────────────────────┘
                                │
                                ▼
┌─────────────────────────────────────────────────────────────────┐
│ Receiving, by the application program, a Scroll Start event     │
│ pushed from the first application programming interface. 464    │
└─────────────────────────────────────────────────────────────────┘
                                │
                                ▼
┌─────────────────────────────────────────────────────────────────┐
│ Responsive to receiving, by the application program, the Scroll │
│ Start event, executing second programmed instructions formatted │
│ to cause receiving, by the application program, one or more     │
│ Scroll Wheel events respectively associated with one or more    │
│ activations of a scroll wheel. 466                              │
└─────────────────────────────────────────────────────────────────┘
                                │
                                ▼
┌─────────────────────────────────────────────────────────────────┐
│ Causing executing, at the computer, third programmed            │
│ instructions formatted to cause processing the one or more      │
│ Scroll Wheel events to determine a required displacement for    │
│ one or more markup objects displayed in a transparent window    │
│ of a currently focused element. 468                             │
└─────────────────────────────────────────────────────────────────┘
                                │
                                ▼
┌─────────────────────────────────────────────────────────────────┐
│ Causing executing, at the computer, fourth programmed           │
│ instructions formatted to cause displaying, in the transparent  │
│ window, the one or markup objects at one or more respective     │
│ new screen bounds offset by the determined required             │
│ displacement. 470                                               │
└─────────────────────────────────────────────────────────────────┘
```

*FIG. 4C*

INFERRED EVENT DETECTION AND TEXT PROCESSING USING TRANSPARENT WINDOWS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2021 Grammarly, Inc.

TECHNICAL FIELD

One technical field of the present disclosure is computer-implemented artificial intelligence, in the subfield of natural language processing, using models that are programmed to derive semantics such as intent. Another technical field is computer-implemented natural language text addition, modification, or suggestion. Another technical field is cross-platform computer-implemented or programmed systems for assisting users in the drafting of natural language text.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Natural language is a complex phenomenon that may be difficult to accurately model using digital data and machine-executable instructions. Nevertheless, since the advent of artificial intelligence (AI), computer-implemented natural language processing (NLP) systems have developed certain capabilities to derive semantic meaning from an electronic text or to analyze the syntactic correctness of the electronic text. For example, machine learning (ML)-based techniques have been developed for deriving semantics such as a classification of a document containing the text, the topics of the text, the meaning of the text or portions thereof, a sentiment of the text or portions thereof, an intent of the text or portions thereof, or other semantics. In another example, ML-based techniques have been developed for detecting incorrect, deficient, or non-optimal grammar or syntax. While these ML model outputs are theoretically useful to a drafter of a text for a variety of purposes, such as for improving the clarity or the tone of the drafted text, it remains challenging for writers to use these outputs to improve their writing for several reasons.

First, modern writers draft natural language text with the assistance of a variety of software, across operating systems, both online and offline, including in browsers, extensions, word processors, email clients, and the like. In these varied settings, traditional methods of showing underlines or another markup indicative of ML model output, such as by formatting a text, may be ineffective. For example, formatting may be part of the text and it can be saved to file or sent via email (when a user is drafting text in an email client). Moreover, formatting styles are limited, and it may be impossible to implement advanced markup such as a heat-map using formatting. Finally, adding formatting—which may be a slow operation—may require different processes in different applications, potentially causing difficulties in integrating formatting techniques across a wide variety of platforms, operating systems, software, or browsers.

Second, the digital landscape for drafters of natural language text is frequently fluid, involving a shifting focus: computer users may switch from one window to another, from one application to another, or from one webpage to another. Moreover, computer users may scroll or change the layout of a page displaying text, or they may scroll through the text such that the text presently being displayed on a device display shifts. Throughout these numerous changes and shifts, various software elements may not push event updates or otherwise signal a changed focus or other shift that modifies the text being displayed on a device display—potentially causing a disconnect between the displayed text and ML model outputs like markup.

Spell checking, grammar checking, and other language processing have been implemented in software tools. Commonly, check functions are integrated into a word processor or other application so that the check functionality has direct access to text that is created in the application. Independent check applications also are available, and often offer performance and functionality that is superior to embedded functions. However, operating systems and applications can impose programmatic security controls that prevent one application from directly accessing and changing the text that has been created or displayed using a second application. Consequently, there is no simple way for a first independent application, which implements software-based grammar checking other language processing, to directly access and modify text elements that were created using a completely separate application.

Based on the foregoing, there is an acute need in the relevant technical fields for a flexible computer-implemented high-speed cross-platform system with real-time response capable of inspecting a draft text and suggesting alternative text that improves the original or supplements the original in a manner that clarifies the text and/or improves its tone.

SUMMARY

The appended claims may serve as a summary of the invention.

BRIEF DESCRIPTION OF THE DRAWINGS

In the drawings:

FIG. 4A illustrates an example computer-implemented or programmed process for displaying phrase suggestions output by a trained machine learning model in response to an inferred triggering event.

FIG. 4C illustrates a second example computer-implemented or programmed process for displaying markup in response to an inferred triggering event using a transparent window.

DETAILED DESCRIPTION

Figure 1:
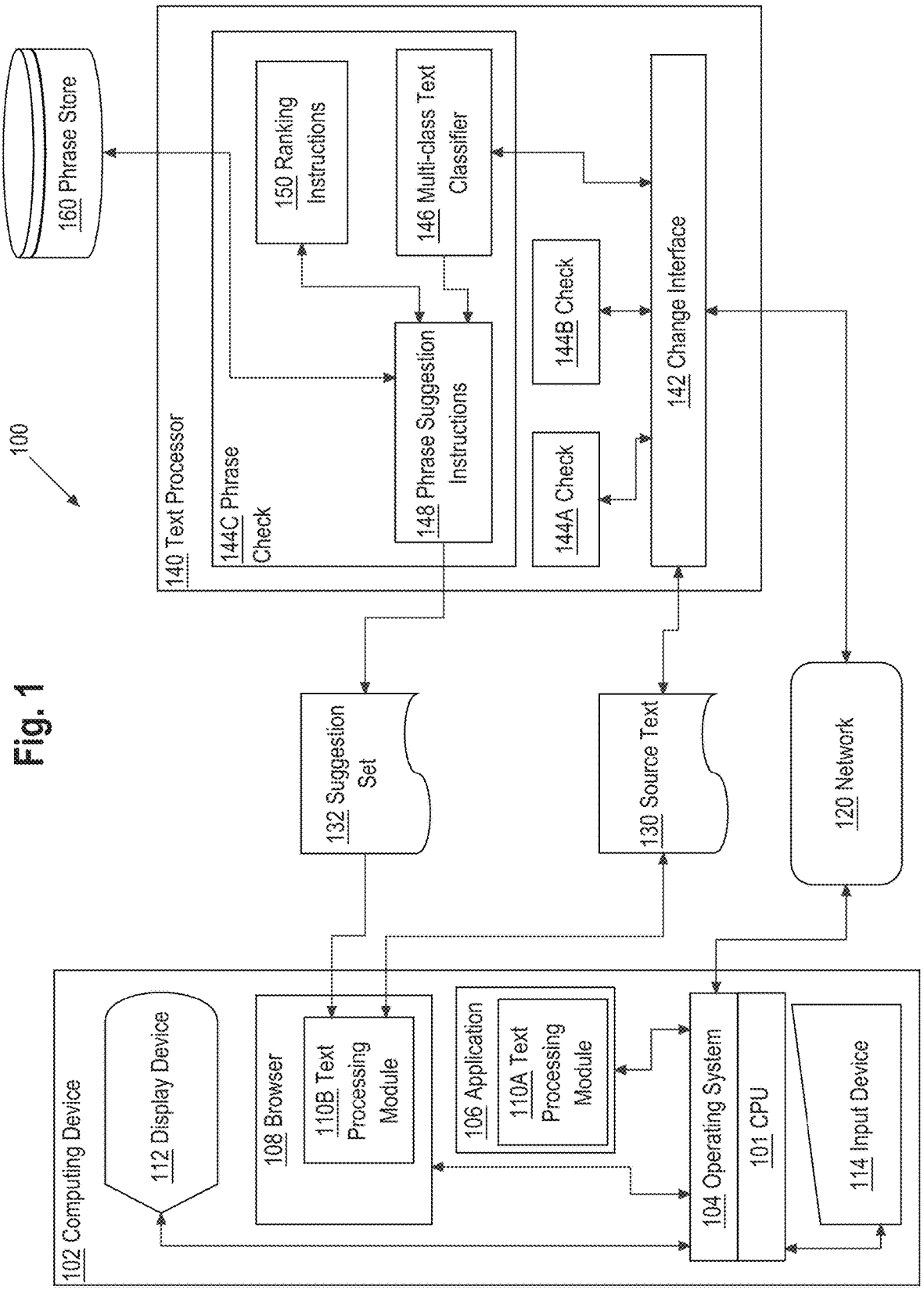
FIG. 1 illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program the computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:
1. General Overview
2. Structural & Functional Overview
   2.1 Example Natural Language Text Processing—Phrase Suggestions
   2.2 Inferred Event Detection
   2.3 Graphical Output Using Transparent Windows
3. Implementation Example—Hardware Overview 1. General Overview In one embodiment, a computer-implemented process is programmed to display phrase suggestions or other machine learning model output generated by a trained model in response to an inferred triggering event. For example, one programmed method involves inferring, by an application program executing on a computer, that a focus change has occurred on a display after receiving a layout change event. Once a currently focused element has been programmatically determined, an embodiment may receive a digital electronic object comprising source text from the currently focused element. In one embodiment, the source text may then be processed using a trained machine learning model to output a set of phrase suggestions for display in a graphical user interface.

In one embodiment, a computer-implemented process is programmed to display output markup in response to an inferred triggering event using a transparent window. In one embodiment, a focus change event is inferred to have occurred responsive to receiving, by an application program executing on a computer, a layout change event, a scroll event, or another event subscribed to by the application program. In one embodiment, the application program may receive the triggering event from an application programming interface (API), such as an accessibility API, including UI Automation, IAccessible2, or OS X Accessibility. In various embodiments, the markup displayed in the transparent window may be underlining, highlighting, a heatmap, shadow, background color, strikethrough, annotation, overlayed suggestions or other text, or another form of markup or visual augmentation. As explained herein, this novel method of displaying markup in a transparent window may facilitate cross-platform functionality and overcome significant limitations present in traditional methods of displaying markup, such as by directly formatting a text.

In one embodiment, the disclosure provides a computer-implemented method, comprising: causing executing, at a computer, first programmed instructions formatted to cause subscribing, by an application program executing on the computer, to a plurality of events provided by a first application programming interface; receiving, by the application program, a layout change event pushed from the first application programming interface; responsive to receiving the layout change event, determining, by the application program, that a change in focused element resulted in a currently focused element; causing executing, at the computer, second programmed instructions formatted to cause generating a transparent window on top of the currently focused element; causing executing, at the computer, third programmed instructions formatted to cause receiving one or more character ranges respectively associated with one or more types of markup; causing executing, at the computer, fourth programmed instructions formatted to cause determining one or more screen bounds corresponding to the one or more character ranges; and causing executing, at the computer, fifth programmed instructions formatted to cause respectively displaying, in the transparent window, the one or more types of markup at the screen bounds corresponding to the one or more character ranges associated with that type of markup.

One embodiment comprises detecting the change in focused element by: querying a second application programming interface, receiving the currently focused element from the second application programming interface, and comparing the currently focused element to a previously focused element programmatically stored by the application program.

One embodiment comprises at least one of the first application programming interface or the second application programming interface being one of UI Automation, IAccessible2, or OS X Accessibility.

One embodiment comprises one of the one or more types of markup being underlining.

One embodiment comprises receiving, from the currently focused element, a digital electronic object comprising a source text; and executing a trained machine learning model on the source text, thereby outputting information specifying the one or more types of markup and the one or more character ranges associated with that type of markup.

In one embodiment, the disclosure provides a computer-implemented method, comprising: causing executing, at a computer, first programmed instructions formatted to cause subscribing, by an application program executing on the computer, to a plurality of events provided by a first application programming interface; receiving, by the application program, a Scroll Start event pushed from the first application programming interface; responsive to receiving, by the application program, the Scroll Start event, executing second programmed instructions formatted to cause receiving, by the application program, one or more Scroll Wheel events respectively associated with one or more activations of a scroll wheel; causing executing, at the computer, third programmed instructions formatted to cause processing the one or more Scroll Wheel events to determine a required displacement for one or more markup objects displayed in a transparent window of a currently focused element; and causing executing, at the computer, fourth programmed instructions formatted to cause displaying, in the transparent window, the one or markup objects at one or more respective new screen bounds offset by the determined required displacement.

One embodiment comprises the application programming interface being one of UI Automation, IAccessible2 or OS X Accessibility.

One embodiment comprises determining the required displacement for the one or more markup objects displayed in the transparent window comprising: programmatically determining that a first markup object will be within a visual bounds after the one or more activations of the scroll wheel; programmatically determining a required displacement for the first markup object; and programmatically assigning the required displacement for the first markup object to be the required displacement for each of the one or more markup objects.

One embodiment comprises determining, by executing programmed instructions formatted to implement binary search, that the one or more markup objects will be within a visual bounds after the one or more activations of the scroll wheel.

One embodiment comprises at least one of the markup objects being an underline object.

One embodiment comprises receiving, from a currently focused element, a digital electronic object comprising a source text; and executing a trained machine learning model on the source text, thereby outputting information specifying one or more types of markup to be applied to one or more character ranges of the source text.

One embodiment comprises programmatically generating the one or more markup objects, the one or more markup objects corresponding to the one or more types of markup to be applied to one or more character ranges of the source text.

In one embodiment, the disclosure provides a computer-implemented method, comprising: causing executing, at a computer, first programmed instructions formatted to cause subscribing, by an application program executing on the computer, to a plurality of events provided by a first application programming interface; receiving, by the application program, a layout change event pushed from the first application programming interface; responsive to receiving the layout change event, determining, by the application program, that a change in focused element resulted in a currently focused element; receiving, from the currently focused element, a digital electronic object comprising a source text; programmatically dividing the source text into a plurality of source text units; programmatically evaluating each particular source text unit among the plurality of source text units using a machine learning model, and receiving a classification output from the machine learning model that classifies each particular source text unit as a particular class of phrase among a plurality of possible classes of phrases; programmatically transforming the classification output to yield an output set of phrase suggestions; and causing displaying, in a graphical user interface displayed on a device display of the computer, one or more phrase suggestions of the output set of phrase suggestions.

One embodiment comprises detecting the change in focused element by: querying a second application programming interface, receiving the currently focused element from the second application programming interface, and comparing the currently focused element to a previously focused element programmatically stored by the application program.

One embodiment comprises each of the first application programming interface and the second application programming interface being one of UI Automation, IAccessible2, or OS X Accessibility.

One embodiment comprises the plurality of source text units comprising a plurality of sentences of the source text.

One embodiment comprises the plurality of source text units comprising a plurality of sentences of the source text, the method further comprising executing the dividing using a computer-implemented parser.

One embodiment comprises the machine learning model comprising a trained multi-class text classifier comprising a FASTTEXT classifier.

One embodiment comprises the machine learning model comprising any of: a plurality of text classifiers coupled as an ensemble; or a plurality of targeted rules that are programmed to find relevant words and coupled to a classifier to approve or reject whether an instance of a word is correct.

One embodiment comprises the trained multi-class text classifier machine learning model being trained to classify each particular source text unit as a particular class of phrase from among: thank, happy birthday, ask for help, decline invitation, follow up, congratulate, introduce, apology, announcement, setting up a meeting.

One embodiment comprises the one or more phrase suggestions being displayed in a transparent window in the graphical user interface.

In one embodiment, the transparent window may be created within the Windows Presentation Foundation (WPF) framework, and the transparent window may be programmed with click through properties. In one embodiment, the transparent window may be created within the AppKit framework, and the transparent window may be programmed with click through properties.

2. Structural & Functional Overview

FIG. 1 illustrates a distributed computer system showing the context of use and principal functional elements with which one embodiment could be implemented. In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In the example of FIG. 1, a computing device 102 is communicatively coupled via a network 120 to a text processor 140. In one embodiment, computing device 102 comprises a client-type computing device such as a personal computer, laptop computer, tablet computer, smartphone, or notebook computer. For purposes of illustrating a clear example, a single computing device 102, network 120, and text processor 140 are shown in FIG. 1, but practical embodiments may include thousands to millions of computing devices 102 distributed over a wide geographic area or over the globe, and hundreds to thousands of instances of text processor 140 to serve requests and computing requirements of the computing devices.

Computing device 102 comprises, in one embodiment, a central processing unit (CPU) 101 coupled via a bus to a display device 112 and an input device 114. In some embodiments display device 112 and input device 114 are integrated, for example, using a touch-sensitive screen to implement a soft keyboard. CPU 101 hosts operating system 104, which may include a kernel, primitive services, a networking stack, and similar foundation elements implemented in software, firmware, or a combination. Operating system 104 supervises and manages one or more other programs. For purposes of illustrating a clear example, FIG. 1 shows the operating system 104 coupled to an application 106 and a browser 108, but other embodiments may have more or fewer apps or applications hosted on computing device 102.

In one embodiment, at runtime, one or more of application 106 and browser 108 may load, or be installed with, a text processing module 110A, 110B, which comprises executable instructions that are compatible with text processor 140 and may implement application-specific communication protocols to rapidly communicate text-related commands and data between the module and the text processor. Text processing modules 110A, 110B may be implemented as runtime libraries, browser plug-ins, browser extensions, or other means of adding external functionality to otherwise unrelated, third-party applications or software. The precise means of implementing a text processing module 110A, 110B or to obtain input text is not critical provided that, if text processing module 110A, 110B is implemented as an extension, then said extension is compatible with and can be functionally integrated with a host application 106 or browser 108. As explained further herein with more specificity, text processing module 110A, 110B may also be implemented as a standalone application instead of as an extension.

In some embodiments, a text processing module 110A may install as a stand-alone application that communicates programmatically with either or both of the operating system 104 and with an application 106. For example, in one implementation, text processing module 110A executes independently of application 106 and programmatically calls services or APIs of operating system 104 to obtain the text that has been entered in or is being entered in input fields that the application manages. Accessibility services or accessibility APIs of the operating system 104 may be called for this purpose; for example, an embodiment can call an accessibility API that normally obtains input text from the application 106 and outputs speech to audibly speak the text to the user, but use the text obtained by the accessibility service in the processes that are described for FIG. 2 and other sections herein. Example accessibility APIs which may be used for these purposes include UI Automation, IAccessible2, or OS X Accessibility.

In one embodiment, text processing module 110A, 110B may execute programmed instructions formatted to cause subscribing to one or more events provided by APIs, including one or more events provided by the aforementioned accessibility APIs. In various embodiments, the programmed instructions are formatted to cause subscribing to one or more APIs provides by an operating system 104, such as a WINDOWS or a MAC OS operating system. Such APIs may be referred to as "low-level" APIs. Various events may be programmatically subscribed to, including layout change events or scroll events. Such events may be indicative of a change in focused element or of a likelihood of different text being displayed on display device 112.

In some embodiments, events required for detecting new text being displayed on display device 112 may not be received by text processing module 110A, 110B. In such embodiments, global event hooks (such as CGEventTap) may be programmatically implemented to observe mouse or trackpad input and content updates may be triggered based on those observations. For example, text processing module 110A, 110B may be programmed to observe scroll events, mouse movement events, mouse button pressed events, arrow key pressed events, or other events, and to schedule light-weight updates for such events. In an embodiment, subsequent scroll events may be ignored while the update is being processed and then may be subsequently processed in turn. In one embodiment, in the WINDOWS context, the equivalent functionality of CGEventTap may be accomplished using SendInput and SetWindowsHookEx.

In some embodiments, each text processing module 110A, 110B is linked, loaded with, or otherwise programmatically coupled to or with one or more of application 106 and browser 108 and, in this configuration, is capable of calling API calls, internal methods or functions, or other programmatic facilities of the application or browser. These calls or other invocations of methods or functions enable each text processing module 110A, 110B to detect text that is entered in input fields, windows, or panels of application 106 or browser 108, instruct the application or browser to delete a character, word, sentence, or another unit of text, and instruct the application or browser to insert a character, word, sentence, or another unit of text.

Each of the text processing modules 110A, 110B is programmed to interoperate with a host application 106 or browser 108 to detect the entry of text in a text entry function of the application or browser and/or changes in the entered text, to transmit changes in the text to text processor 140 for server-side checking and processing, to receive responsive data and commands from the text processor, and to execute presentation functions in cooperation with the host application or browser.

As one functional example, assume that browser 108 renders an HTML document that includes a text entry panel in which a user can enter free-form text describing a product or service. The text processing module 110B is programmed to detect user selection of the text entry panel, the entry of text or changes in the text within the panel, and to transmit all such text changes to text processor 140. In an embodiment, each text processing module 110A, 110B is programmed to buffer or accumulate text changes locally over a programmable period, for example, five seconds, and to transmit the accumulated changes over that period as a batch to text processor 140. Buffering or accumulation in this manner, while not required, may improve performance by reducing network messaging roundtrips and reducing the likelihood that text changes could be lost due to packet drops in the networking infrastructure.

A commercial example of text processing modules 110A, 110B is the GRAMMARLY extension, commercially available from Grammarly, Inc. of Kyiv, Ukraine.

Network 120 broadly represents one or more local area networks, wide area networks, campus networks, or internetworks in any combination, using any of terrestrial or satellite, wired, or wireless network links.

In an embodiment, the text processor 140 comprises one or more server computers, workstations, computing clusters, and/or virtual machine processor instances, with or without network-attached storage or directly attached storage, located in any of enterprise premises, private datacenter, public datacenter and/or cloud computing center. Text processor 140 broadly represents a programmed server computer having processing throughput and storage capacity sufficient to communicate concurrently with thousands to millions of computing devices 102 associated with different users or accounts. For purposes of illustrating a clear example and focusing on innovations that are relevant to the appended claims, FIG. 1 omits basic hardware elements of text processor 140 such as a CPU, bus, I/O devices, main memory, and the like, illustrating instead an example software architecture for functional elements that execute on the hardware elements. Text processor 140 also may include foundational software elements not shown in FIG. 1, such as an operating system consisting of a kernel and primitive services, system services, a networking stack, an HTTP server, other presentation software, and other application software. Thus, text processor 140 may execute at a first computer, and text processing modules 110A, 110B may execute at a second computer.

In an embodiment, text processor 140 comprises a change interface 142 that is coupled indirectly to network 120. Change interface 142 is programmed to receive the text changes that text processing modules 110A, 110B transmit to text processor 140, and to distribute the text changes to a plurality of different checks 144A, 144B, 144C. To illustrate a clear example, source text 130 of FIG. 1 represents one or more text changes that text processing module 110B transmits to change interface 142. In an embodiment, change interface 142 is programmed to distribute each and every text change arriving from a text processing module 110A, 110B to all of the checks 144A, 144B, 144C, which execute in parallel and/or in independent threads.

Thus, in one embodiment, the text processor 140 may be programmed to programmatically receive a digital electronic object comprising a source text, a message with the source text, an application protocol message with the source text, an HTTP POST request with the source text as a payload, or using other programmed mechanics. In various embodiments, the first computer executes a text processor that is communicatively coupled to a text processing module 110A, 110B that is executed at the second computer and programmatically receives the digital electronic object comprising the source text via a message initiated at the text processing module and transmitted to the text processor; and/or the a text processing module 110A, 110B executes in association with an application program that is executing at the second computer, the a text processing module 110A, 110B being programmed to automatically detect a change in a text entry window of the application program and, in response, to initiate the message; and/or the text processor executes in association with browser that is executing at the second computer, the a text processing module 110A, 110B being programmed to automatically detect a change in a text entry widget of the browser and, in response, to initiate the message.

Each of the checks 144A, 144B, 144C is programmed to execute a different form of checking or processing of a text change that has arrived. Example functions that checks 144A, 144B could implement include grammar checking, tone detection, spell checking, and translation. In an embodiment, check 144C is programmed as a phrase check, and therefore it is also denoted "phrase check 144" in this description. In an embodiment, phrase check 144 comprises a multi-class text classifier coupled to phrase suggestion instructions 148, which are coupled to ranking instructions 150; however, other machine learning models can be used. For example, an embodiment may use a number of individual text classifiers ensembled together, or targeted rules may be programmed to find relevant words and then coupled to a classifier to approve or reject whether the instance of a word is correct, thus using a coarse rule followed by ML-based filtering.

Furthermore, phrase check 144C is coupled to or can access, a phrase store 160, which may be integrated with text processor 140 or implemented as separate storage. In an embodiment, phrase store 160 comprises a database, flat file system, object store, or another digital data repository that stores a large number of textual phrase suggestions, in association with category values or tags that specify a category or type of communication, text, or document in which the suggestions could be substituted. Thus, phrase check 144 and/or text processor 140 may be programmed for evaluating each particular source text unit among the plurality of source text units using a trained multi-class text classifier machine learning model and receiving a classification output from the multi-class text classifier that classifies each particular source text unit as a particular class of phrase among a plurality of possible classes of phrases.

Figure 2:
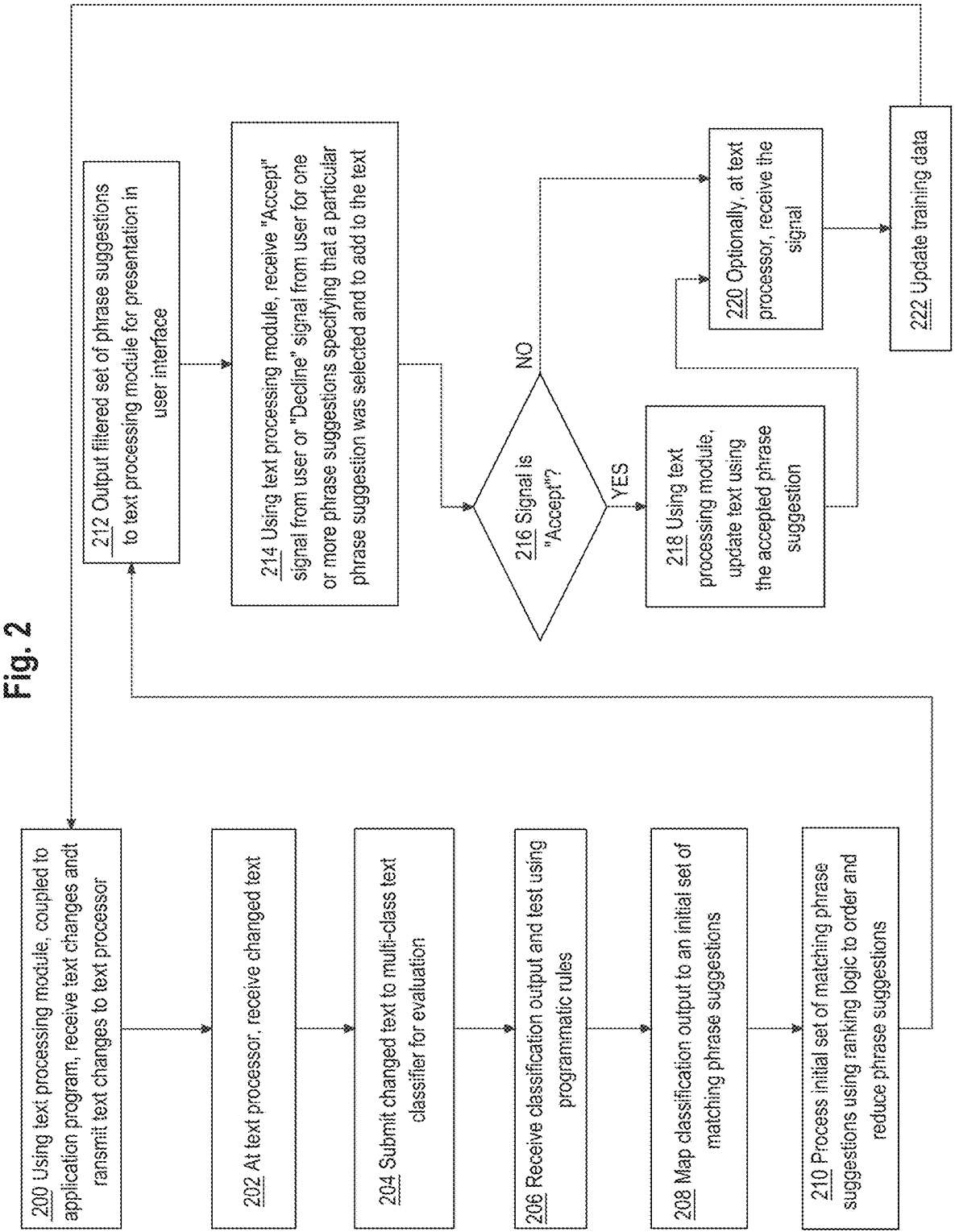
FIG. 2 illustrates a computer-implemented process of classifying a source text, determining phrase suggestions, and presenting the phrase suggestions, in one embodiment.

As further described herein for FIG. 2, in an embodiment, phrase suggestion instructions 148 are programmed, in part, to output a suggestion set 132 to transmit to text processing module 110B.

2.1 Example Natural Language Text Processing—Phrase Suggestions

In one embodiment, a computer-implemented process is programmed to detect a type or category of document that is being drafted and to suggest one or more phrases or sentences to substitute for the original, the suggested text being potentially more personable and sincere than the writer's original text. Suggested text phrases may be selected from a large corpus of previously manually drafted sentences and phrases. Selected text phrases may be ranked and filtered to result in suggesting a manageable set of text phrases. With this approach, adding specially chosen content to existing content can change the warmth or tone of the text while preserving its meaning. Unlike prior approaches, in an embodiment, the process may be programmed to artificially understand the intent of the original text as a basis of suggesting other content to add. Furthermore, embodiments may interoperate with a visual or graphical user interface that is programmed to enable users to see what the change to the text will be and whether they want it before they engage with the suggestion.

FIG. 2 illustrates a computer-implemented process of classifying a source text, determining phrase suggestions, and presenting the phrase suggestions, in one embodiment. FIG. 2 and each other flow diagram herein is intended as an illustration at the functional level at which skilled persons, in the art to which this disclosure pertains, communicate with one another to describe and implement algorithms using programming. The flow diagrams are not intended to illustrate every instruction, method object, or sub-step that would be needed to program every aspect of a working program, but are provided at the same functional level of illustration that is normally used at the high level of skill in this art to communicate the basis of developing working programs.

At step 200 of FIG. 2, in an embodiment, using a text processing module 110A, 110B coupled to an application program, the process receives text changes and transmits the text changes to a text processor. For example, as described for FIG. 1, each text processing module 110A, 110B is programmed to transmit any change in the text to text processor 140. Thus, invocation of the process of FIG. 2 occurs in response to a user drafting text in application 106 (FIG. 1) or browser 108, based upon a text processing module 110A, 110B detecting a change in source text 130 entered at the application or browser and transmitting the source text to change interface 142 of text processor 140 for evaluation using checks 144A, 144B, 144C.

At step 202, at the text processor, the changed text is received. In some embodiments, the text processor 140 is implemented as a back-end server and is programmed to distribute the text changes to a plurality of modules that are programmed to execute multiple types of checks on the text, and the process of FIG. 2 is implemented as one of the checks. For example, source text 130 is received at phrase check 144 via change interface 142.

In an embodiment, the process of FIG. 2 is programmed first to detect that a suggestion should be given, then selects one or more suggestions to provide. In one approach for detection that a suggestion should be given, phrase check 144 is programmed to form vectors that represent sentences and the surrounding context of source text 130, then searches for matching vectors in a labeled dataset that is digitally stored in phrase store 160. The matching may use fuzzy similarity algorithms. In this manner, the text processor may be programmed for dividing the source text into one or more source text units, and one example of the source text unit is a sentence. The dividing may use a parser or other programmed algorithm capable of inspecting natural language text, identifying tokens or units of the text, identifying syntactic units, and so forth. Other units may be used in other embodiments including clauses, multi-sentence groups, paragraphs, and so forth.

Alternatively, a machine learning model, structured as a text classifier, is trained on a large corpus of source sentences, and then used to evaluate a current sentence, outputting a classification of where to inject a suggestion. For example, at step 204, the changed text is submitted to a multi-class text classifier for evaluation. Referring to FIG. 1, source text 130 may be programmatically transmitted to multi-class text classifier 146. In one embodiment, text classifier 146 implements a multi-class machine learning model capable of outputting a plurality of different label values, each label value representing a type or category of intent represented in the source text.

In one experimental implementation, text classifier 146 has been programmed to support ten types and to output, for each sentence, label values of "0" to "9" which respectively correspond to thank, happy birthday, ask for help, decline invitation, follow up, congratulate, introduce, apology, announcement, setting up a meeting. In some embodiments, the phrase suggestion instructions 148 are programmed to generate phrase suggestions for fewer than all the intents that the text classifier 146 can label. That is, the text classifier may generate label values for certain intents as noted above, but phrase suggestions will not be offered for those intents. Whether phrase suggestions are offered for every intent or label value depends on whether phrase store 160 has been loaded with phrase suggestions for every intent.

In an embodiment, text classifier 146 may be programmed using the FASTTEXT model library authored by Facebook, Inc., and summarized at the time of this disclosure in the folder/tools/fasttext of the internet domain "ai.facebook.com". In experimentation, the inventors determined that FASTTEXT, as supplied by FACEBOOK, does not generalize well without loss of precision when previously unseen labels are processed. In one experiment, FASTTEXT was integrated into a working implementation via these steps:

1. Manually author a small set of target-like sentences.
2. Use Universal Sentence Encoder to find semantically-related sentences from a large random text corpus.
3. Perform human annotation to validate the selected sentences in being truthful to the definition of target intent.
4. Use the validated data as the training dataset for the FASTTEXT classifier.

In another experiment, acceptable results were obtained using FASTTEXT embeddings as a metric of semantic distance between training sentences and user-input sentences under evaluation. Various sources of data for training were evaluated, such as news headlines as a substitute for sentences indicating intent, and ultimately a training dataset of specific intent samples was manually prepared and input. TABLE 1 provides an excerpt of intent samples that could be used in an embodiment.

Table 1—Example Intent Training Dataset intent_samples=[
[
"Thank you for a fruitful meeting earlier today.",
"I especially appreciate your offer to connect me with others in your network.",
"We just wanted to THANK YOU for everything you did for her this year",
"We want to take this opportunity to thank you for all of your hard work and effort as of late.",
"I wanted to personally take this time to thank you for your willingness to engage with me over these last couple of months.",
],
[
"Please do accept our sincere apologies and provide us with another opportunity to redeem ourselves as a viable service provider.",
"I would like to offer my deepest apologies, I genuinely forgot to complete the homework, after I finished creating notes for one course it completed slipped my mind and I assumed I had finished chemistry work.",
"I am sorry for leaving the call yesterday before the meeting was over.",
],
[
"Yes let's meet next week, do you want to meet Monday?",
"Perfect, let's meet on {February 15th} at 09:15 (Local time).",
"Let's meet tomorrow at 12 pm in the office to fix the timeline so as we can meet the deadline.",
"I just wanted to reach out to you guys to set up a meeting where we can all meet.",
],
[

"I just want to confirm whether you received my last email or not.",
"Please confirm if we can include this article in today's report with available content?",
"Also, we talked about the ability to dock a small boat there at the pier. I would like to verify the exact cost of this.",
"Just confirming, are we still on time for the delivery of this load?",
],
[
"Hi, confirming that I have still not received a refund per email trail, please advise.",
"I can confirm that the migration of the product to {Cloud Service Provider} has been successful.",
]
]

APPENDIX 1 is a copy of a JUPYTER notebook that documents a first example of preparing and training a machine learning model that can be used in one embodiment.

APPENDIX 2 is a copy of a JUPYTER notebook that documents a second example of preparing and training a machine learning model that can be used in one embodiment.

APPENDIX 3 is a copy of a JUPYTER notebook that documents an example of retraining a machine learning model that can be used in one embodiment.

Each of APPENDIX 1, APPENDIX 2, APPENDIX 3 forms a part of the present specification and/or disclosure. To the extent that APPENDIX 1, APPENDIX 2, APPENDIX 3 are deemed separate documents, each and every one of APPENDIX 1, APPENDIX 2, APPENDIX 3 is hereby incorporated by reference as if fully set forth herein.

All of APPENDIX 1, 2, 3 are based on FASTTEXT. As an alternative to FASTTEXT, a very deep convolutional neural network (VDCNN) can be used. Experimental implementations also have used embedding of sentences with multiple feed-forward layers in a CNN.

Phrase store 160 digitally stores a plurality of different sentences, clauses, or phrases, each stored in association with a label value corresponding to one or more of the label values that text classifier 146 can output. Phrase store 160 may use relational database tables, non-relational tables, flat files, or other forms of digital data storage to store sentences, clauses, or phrases with label values. In some embodiments, the sentences, clauses, or phrases are manually prepared and manually labeled. For example, analytical linguists or copywriters can draft high-quality phrase suggestions for storing in phrase store 160.

Additionally or alternatively, sentences, clauses, or phrases may be synthesized, or generated programmatically, under stored program control by using a sentence similarity processor to receive an input sentence and to generate output synthetic data for phrase store 160. For example, text semantic similarity can be processed using open-source software available from GOOGLE using TENSORFLOW HUB and DATAFLOW, as described in the article "analyzing-text-semantic-similarity-using-tensorflow-and-cloud-dataflow" which is available at the time of this disclosure in the folder/architecture of the internet domain cloud.google.com. Furthermore, similar programmatic techniques may be used to synthesize a plurality of sentences, clauses, or phrases to supplement a training dataset with which the text classifier 146 is trained.

Referring again to FIG. 2, at step 206, the classification output is received and tested using a plurality of programmatic rules that test whether a particular phrase lacks a subordinate clause with more details, whether a phrase occurs in a prominent position of the source text 130, whether the phrase occurs under negations, whether the phrase has a correct sequence of words and structure, and so forth. Thus, in an embodiment, the process of FIG. 2 is programmed to ensure that the detection results are accurate and useful.

At step 208, the process is programmed to map the classification output to an initial set of matching phrase suggestions, for example, in a plurality of candidate phrase suggestions that are stored in a digital database. Thus, after detection of qualifying sentences, phrases, or clauses in source text 130, the process determines which phrases to suggest, selected from a large plurality of candidate phrase suggestions in phrase store 160. Step 208 may include generating and submitting a query to phrase store 160 to select a result set of all stored phrases having label values that match an output label value from text classifier 146.

However, the result set may contain too many candidate phrases to present in a user interface of the application 106 or browser 108 (FIG. 1). Therefore, in an embodiment, at step 210, the process is programmed to process the initial set of matching phrase suggestions using ranking instructions 150 to order the phrase suggestions and filter or reduce the phrase suggestions to a reduced-size set, comprising an output set of phrase suggestions that is fewer in number than the initial set. In some embodiments, filtering is executed first, for example, to select the first five or ten candidate phrases from the result set, and then ranking is used. Alternatively, filtering to five or ten candidate phrases can be executed without ranking.

In some embodiments, approaches other than mapping followed by filtering may be used at step 208, step 210. For example, instructions may be programmed to score the candidate phrase suggestions, for example, using an ElasticSearch information retrieval score, and to select the top N candidates, without a need for a filtering step. The value "N" may vary in different embodiments; example values are "1" to "10" or any integer within a range of "1" to "10".

The ranking instructions 150 may be programmed to rank the initial set of phrase suggestions according to any useful ranking criterion such as similarity to a source text unit, dissimilarity, popularity across a community of users, or other criteria. In one ranking approach, step 210 is programmed to order the result set of phrase suggestions in inverse order of similarity to the source text 130. Ordering in inverse order of similarity can avoid presenting, to the user, a suggestion that is too similar to the source text 130. To support this step, in an embodiment, the result set of candidate phrases obtained at step 208 can be submitted in real-time to a sentence similarity processor to receive, in return, a similarity value for each candidate phrase that reflects a degree of similarity to the source text 130. Or, ranking instructions 150 may be programmed to calculate, in real-time, a set similarity value between n-grams that are present in source text 130 and each candidate phrase of the result set; the resulting set similarity values may be programmatically provided to phrase suggestion instructions 148 for presentation, in suggestion set 132, in order of lowest similarity first. The result set of candidate phrase suggestions received from phrase store 160 may comprise multiple similar variants. Examples include "I am grateful" and "I am very grateful".

In an embodiment, the effect of ranking instructions 150 when programmed as just described is to avoid placing such similar variants in suggestion set 132 so that variants are near to one another in order when presented in the application 106 or browser 108 via the text processing modules 110A, 110B. To enhance this effect, ranking instructions 150 and/or phrase suggestion instructions 148 may be programmed using a clustering approach. For example, candidate phrase suggestions of the result set may be divided into a plurality of different groups by executing a clustering algorithm on the result set to result in grouping similar phrase suggestions. One cluster might include all phrases expressing gratitude, for example. Five or six clusters could be used, for example, and ranking instructions 150 and/or phrase suggestion instructions 148 may be programmed to conduct ranking as previously described and then select the highest-ranked phrase from each cluster successively to form a final set of phrase suggestions for output as the suggestion set 132.

In an embodiment, source text 130 may comprise a plurality of different sentences each yielding different label values for different types or different categories when the sentences are processed using the text classifier 146. In an embodiment, phrase suggestion instructions 148 are programmed to generate phrase suggestions only for a first label value that is initially output from text classifier 146 for a first sentence that is processed. Or, in an embodiment, the text classifier 146 is programmed to process all sentences that are present in source text 130, resulting in outputting a plurality of different label values; phrase suggestion instructions 148 may be programmed to select one label value, using pseudo-random selection, from among all the label values and then select candidate phrase suggestions only for the selected single label value.

At step 212, the process is programmed to output a filtered set of phrase suggestions to the text processing module 110A, 110B for presentation in a user interface, for example, at a mobile computing device or another computing device that hosts or executes the text processing module 110A, 110B. Step 212 may include filtering the initial set of matching phrase suggestions, for example, to select only the top N matching phrase suggestions, based on the ranking. N may have a range of values depending on the display capabilities of the mobile computing device or another computing device that hosts or executes the text processing module 110A, 110B or depending upon the size of a graphical user interface panel, widget, or another visual element in which the suggestions are to be displayed. In one embodiment, the range of N is from one to ten, but other ranges could be used in different embodiments and the specific value of N is not critical.

At this stage, the text processing module 110A, 110B, at the mobile computing device or another computing device, may be programmed to output a display of the filtered set of phrase suggestions that have been received at the text processing module 110A, 110B via step 212. Output may comprise displaying a list of the filtered phrase suggestions, instantiating a window, panel, or widget within a graphical user interface, or similar visual output. The specific means of output is not critical provided that some means is provided to a user, of the mobile computing device or another computing device that hosts or executes the text processing module 110A, 110B, to view and consider whether to select one of the phrase suggestions.

Figure 3:
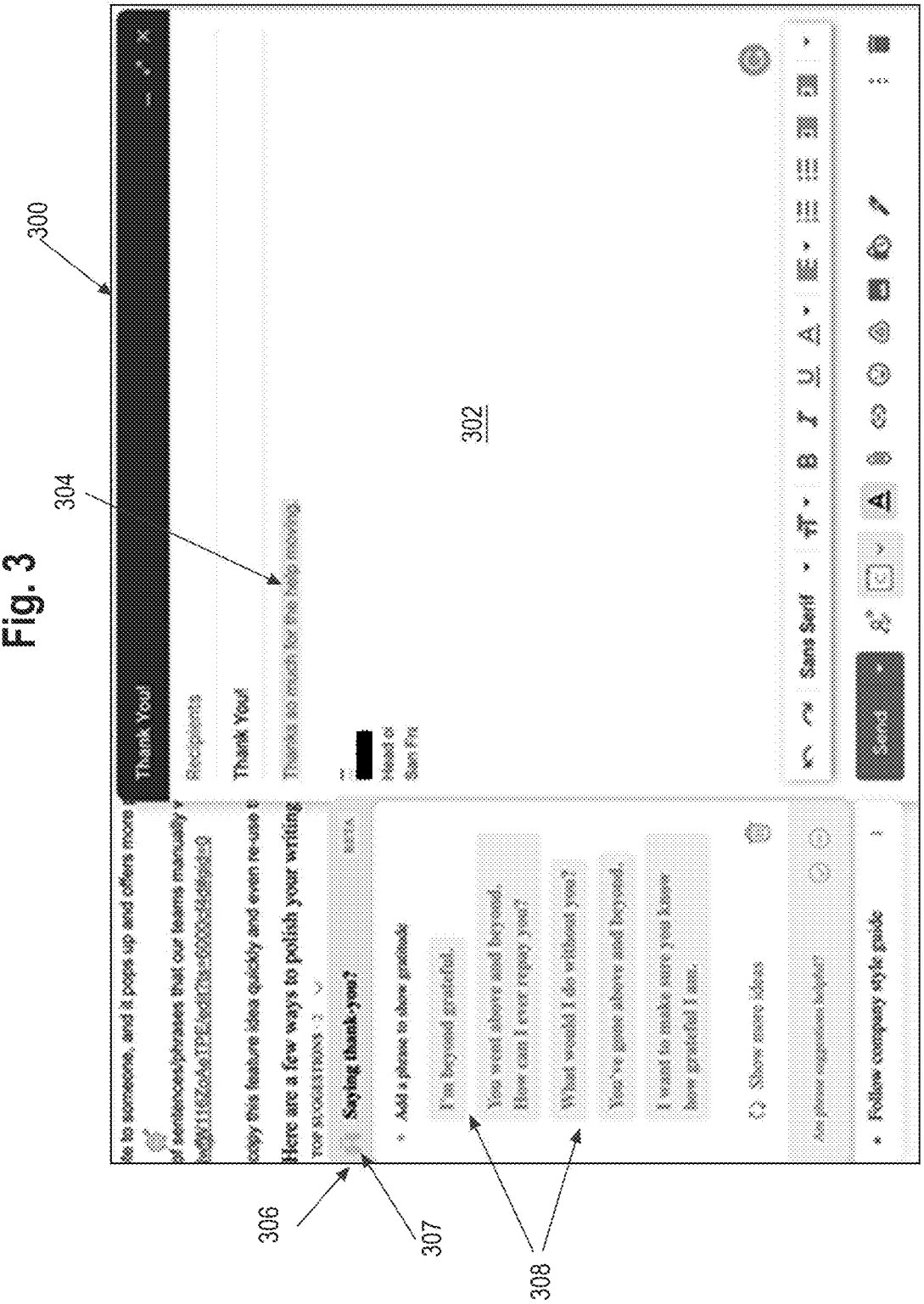
FIG. 3 illustrates an example of a graphical user interface that may be programmed to display phrase suggestions in conjunction with an application.

FIG. 3 illustrates an example of a graphical user interface that may be programmed to display phrase suggestions in conjunction with an application. In FIG. 3, a graphical user interface (GUI) window 300 is displayed in the ordinary operation of an application program, browser, or other program executed at a second computer, such as a mobile computing device. In an embodiment, an application running with GUI window 300 provides electronic mail (email) composing functions and has instantiated a sub-window 302 which shows, in FIG. 3, a portion of an email that is undergoing composition. The sub-window includes a Recipients list, a subject of "Thank You!" in this example, and a source text unit 304 which states, in this example, "Thanks so much for the help moving."

In response to input at the second computer entering the source text unit 304, a text processing module 110A, 110B is programmed to instantiate and cause displaying a second sub-window 306 that comprises a header bar 307 and a plurality of output phrase suggestions 308. The text processing modules 110A, 110B may be programmed to use system calls, function calls, method calls, or other programmatic means to instantiate sub-windows and cause labels and data to be displayed. In this example, the header bar 307 states "Saying thank-you?" to indicate that the multi-class text classifier has classified the source text unit 304 as a "Thank you" phrase. The output phrase suggestions 308 each correspond to the same sentiment, category, or class as the source text unit 304, based on the classification and mapping steps that have been previously described. In an embodiment, each of the output phrase suggestions 308 is output as a selectable hyperlink which, when selected, causes the text processing module 110A, 110B to execute a call to delete the source text unit 304 in the sub-window 302 and to insert the selected output phrase suggestion 308.

At step 214, the process is programmed to receive, using the text processing module 110A, 110B, a signal from a user of the mobile computing device or the other computing device that hosts or executes the text processing module 110A, 110B to accept or decline one or more of the phrase suggestions, specifying that a particular phrase suggestion was selected to add to the text. For purposes of illustrating a clear example, step 214 and aspects of this description use the labels Accept and Decline to refer to input signals that could be received at step 214 or other steps, but these labels are merely examples and different implementations may use other internal values to identify different input.

At step 216, the process is programmed to determine whether an Accept signal or equivalent, was received as input. If step 216 is FALSE or NO, then control transfers to step 220 at which, optionally, the text processor may receive the signal, for example, a Decline signal. At step 222, the process may be programmed to update training data, used to train the multi-class text classifier, based on the signal. Thus, steps 216, 220, 222 may form a feedback loop by which training data is continuously updated based on user signals to indicate whether a particular phrase suggestion was correct, or useful, or not.

If step 216 is TRUE or YES, then at step 218, the process is programmed to update, using the text processing module 110A, 110B, the source text using the accepted phrase suggestion. Updating may comprise, for example, the text processing module 110A, 110B programmatically invoking an API call, internal method, or other programmed function, of the browser or app that the text processing module 110A, 110B extends, to insert the phrase suggestion into the source text, or to delete the original sentence and insert the phrase suggestion. Control then transfers to step 220, which is processed as described above.

The approaches disclosed herein provide efficient technical means for automatically updating a text that has been written using computer support. Unlike past approaches, the intent of a source text may be detected programmatically and then used to drive automatic machine selection of candidate phrase suggestions, with ranking if appropriate to eliminate candidate phrase suggestions that are too similar to one another. An ancillary benefit is that the accuracy, tone, and clarity of written communication may be improved with computer assistance. The approaches herein provide efficient machine assistance to individuals who are not naturally strong writers in finding text that accurately reflects the original intent of their draft text.

2.2 Inferred Event Detection

One embodiment of the disclosed technology is programmed to detect a changing focus at computing device 102 so that ML model output such as phrase suggestions or markup, including underlines, can be generated and rendered in a newly focused element. In some embodiments, text processing module 110A, 110B may be programmed to receive input directly indicating a changing focus at computing device 102. For example, text processing module 110A, 110B may be programmed to register an "AddFocusChangedEventHandler" with "uiautomationclient.h" in a WINDOWS operating system environment, effectively subscribing to focus change events pushed by the accessibility API. The changing focus event may fire, for example, when a user of computing device 102 switches between applications or places an input cursor in a different field. In other operating system environments, similar methods may be used to detect a changing focus.

However, in certain instances, an embodiment of the disclosed technology may not receive or may not be able to receive direct evidence of a changing focus. One embodiment of the disclosed technology is programmed to solve such technical problems through inferred event detection.

FIG. 4A illustrates an example computer-implemented or programmed process 400 for displaying phrase suggestions output by a trained machine learning model in response to an inferred triggering event.

In one embodiment, process 400 is programmed to begin execution at step 402 by causing executing, at computing device 102, first programmed instructions formatted to cause subscribing, by an application program executing on computing device 102, to a plurality of events provided by a first application programming interface. In one embodiment, the application program may be text processing module 110A, 110B. The application programming interface may be an accessibility API, as described with more specificity herein, or another API, such as a system service, system primitive, system call, or low-level API provided by operating system 104. In one embodiment, the programmed process implemented using text processing module 110A, 110B can subscribe to an event such as a layout change event or a scroll event, thereby receiving event data to infer that the text being displayed on display device 112 has changed, necessitating a change or repositioning in, for example, ML model output. In one example, the functionality of an API used by one embodiment may include SetWindowsHookEx in the WINDOWS context. In one embodiment, subscribing to and listening for SetWindowsHookEx and other mouse native events may be useful because such events can be consumed with a reduced amount of delay compared to other types of events.

In one embodiment, process 400 is programmed to execute step 404 by receiving, by the application program, a layout change event pushed from the first application programming interface. The layout change event may be intentionally triggered by a user of the client computing device 102, or it may be the result of computing device 102 executing control instructions provided by a browser 108 or other software executing on the client computing device 102. In one example, a layout change event is triggered by the resizing of a window which is a currently focused element being displayed on device display 112, natural language text being drafted in the window. More specifically, a layout change event might be pushed by an accessibility API when an email client composition pane is resized.

In one embodiment, the flow of execution of process 400 may subsequently dictate the execution of step 406. At step 406, responsive to receiving the layout change event, process 400 may be programmed for determining, by the application program, that a change in focused element resulted in a currently focused element. Such inferred event detection represents a novel method of using a layout change event as a proxy for a change in focused element event, which may be particularly useful when technical limitations of a system prevent receiving a change in focused element event directly. For example, an accessibility API may not have the functionality to push a change in focused element event to a subscribed application, but text processing module 110A, 110B may be programmed to query a particular API for a currently focused element. In embodiments, process 400 may be programmed to compare a received currently focused element from a query to a digitally stored previously focused element to determine if a change in focused element has indeed occurred.

In one embodiment, process 400 is programmed to execute step 408 by receiving, from the currently focused element, a digital electronic object comprising a source text 130. In an embodiment, the digital electronic object received at step 404 comprises a representation of a natural language text document currently undergoing composition at computing device 102. As explained with more specificity herein, source text 130 may comprise one or more text changes that text processing module 110B (or 110A) transmits to change interface 142.

In one embodiment, process 400 is programmed to execute step 410 by programmatically dividing the source text 130 into a plurality of source text units, such as sentences. The dividing may use a parser or other programmed algorithm capable of inspecting natural language text, identifying tokens or units of the text, identifying syntactic units, and so forth. Other units may be used in other embodiments including, characters, strings, words, clauses, multi-sentence groups, paragraphs, and so forth. Specific techniques for dividing a text into sentences or other units, using tokenization or other division approaches, are well-known in the field and unnecessary to describe in this disclosure.

In one embodiment, process 400 is programmed to execute step 412 by programmatically evaluating each particular source text unit among the plurality of source text units using a machine learning model, and receiving a classification output from the machine learning model that classifies each particular source text unit as a particular class of phrase among a plurality of possible classes of phrases.

In one embodiment, process 400 is programmed to execute step 414 by programmatically transforming the classification output to yield an output set of phrase suggestions.

In one embodiment, process 400 is programmed to execute step 416 by causing displaying, in a graphical user interface displayed on a device display of the computer, one or more phrase suggestions of the output set of phrase suggestions.

2.3 Graphical Output Using Transparent Windows

Figure 4B:
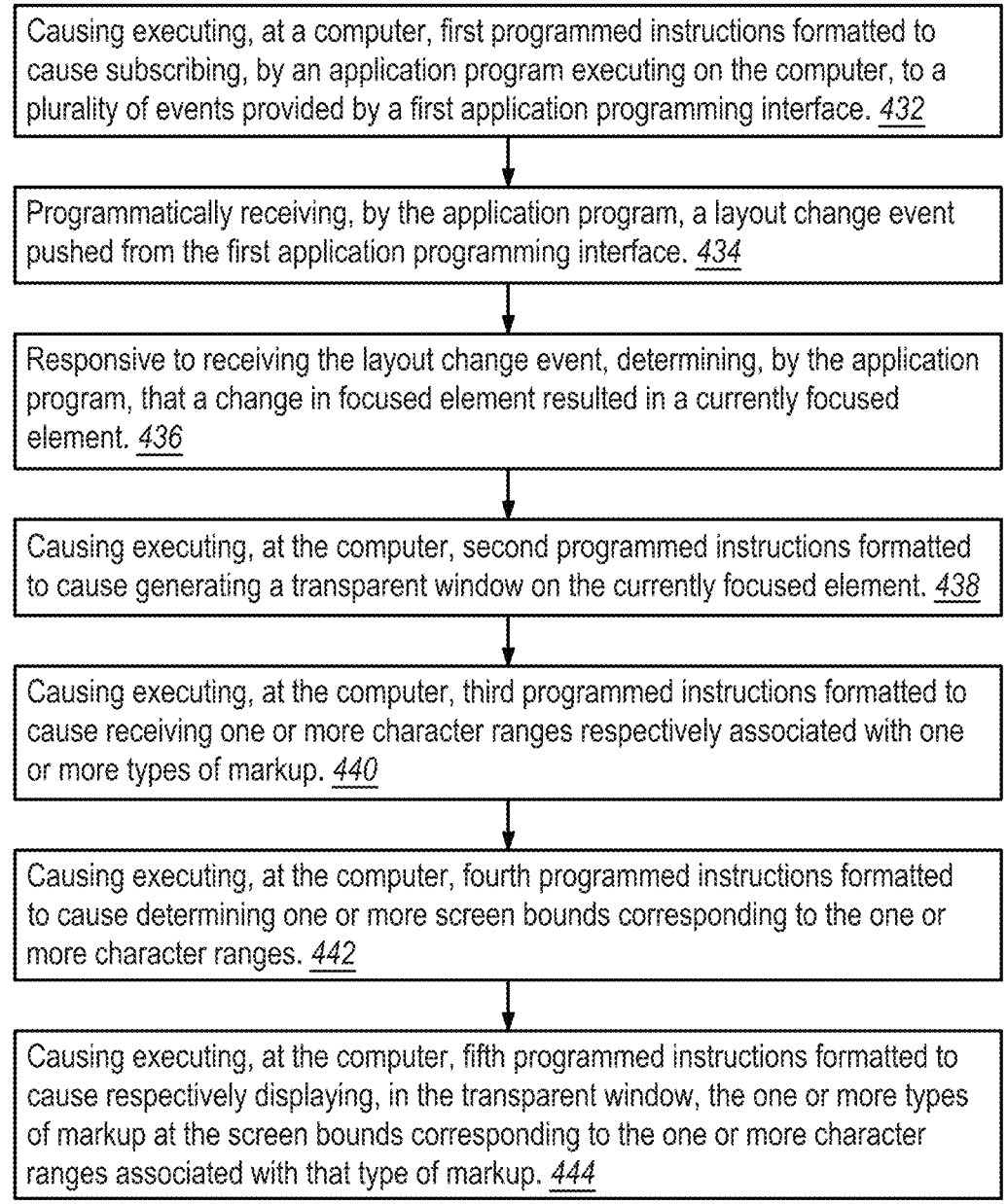
FIG. 4B illustrates an example computer-implemented or programmed process for displaying markup in response to an inferred triggering event using a transparent window.

FIG. 4B illustrates an example computer-implemented or programmed process 430 for displaying markup in response to an inferred triggering event using a transparent window.

In one embodiment, process 430 is programmed to begin execution at step 432 by causing executing, at computing device 102, first programmed instructions formatted to cause subscribing, by an application program executing on computing device 102, to a plurality of events provided by a first application programming interface. In one embodiment, the application program may be text processing module 110A, 110B. The application programming interface may be an accessibility API, as described with more specificity herein, or another API, such as a "low level" API provided by operating system 104. In one embodiment, subscribing to an event such as a layout change event or a scroll event allows the programmed process implemented using text processing module 110A, 110B to infer that the text being displayed on display device 112 has changed—necessitating a change or repositioning in, for example, ML model output such as underlining or other markup.

In one embodiment, process 430 is programmed to execute step 434 by receiving, by the application program, a layout change event pushed from the first application programming interface. The layout change event may be intentionally triggered by a user of client computing device 102, or it may be the result of computing device 102 executing control instructions provided by a browser 108 or other software executing on client computing device 102. In one example, a layout change event is triggered by the resizing of a window which is a currently focused element being displayed on device display 112, natural language text being drafted in the window. More specifically, a layout change event might be pushed by an accessibility API when an email client composition pane is resized.

In one embodiment, the flow of execution of process 430 may subsequently dictate the execution of step 436. At step 436, process 430 may be programmed, in response to receiving the layout change event, for determining, by the application program, that a change in focused element resulted in a currently focused element. Programmed inferred event detection, via process 430, represents a novel method of using a layout change event as a proxy for a change in focused element event, which may be particularly useful when technical limitations of a system prevent receiving a change in focused element event directly. For example, an accessibility API may not have the functionality to push a change in focused element event to a subscribed application, but text processing module 110A, 110B may be programmed to query a particular API for a currently focused element. In embodiments, process 430 may be programmed to compare a received currently focused element from a query to a digitally stored previously focused element to determine if a change in focused element has indeed occurred.

In one embodiment, process 430 is programmed to execute step 438 by causing executing, at client computing device 102, second programmed instructions formatted to cause generating a transparent window on top of the currently focused element. In one embodiment, generating the transparent window to render markup such as underlining represents a technical solution to enhance the interoperability of ML output display processes in diverse technological settings: For security purposes or other reasons, users may draft natural language electronic text in settings where direct access to the text by text processing module 110A, 110B is challenging or impossible. To solve this problem, the present disclosure uses the novel technique of generating a transparent window and rendering markup or other visual text augmentation, resulting from the application of ML models to the source text, in the transparent window.

In one embodiment, the transparent window generated at step 438 is programmed to be click-through, such that a user can position an input caret in the text control under the window and interact with visual elements rendered in the window at the same time. However, a technical challenge exists in detecting clicks and systematically reacting to the clicks. Thus, one embodiment is programmed to use global event hooks to monitor mouse or trackpad activity of the user computer and perform custom hit-testing and dispatch of events with text processing module 110A, 110B. One embodiment is programmed to execute hit-testing by querying a window manager (for example, using CGWindowListCopyWindowInfo function) and then checking if a mouse cursor is inside some window which resides above.

In one embodiment of process 430 operating in a WINDOWS operating system environment, the transparent window generated at step 438 is programmed to be implemented with WINDOWS PRESENTATION FOUNDATION (WPF), a resolution-independent UI framework using a vector-based rendering engine. Process 430 may be programmed to set window properties at step 438 via WinAPI, including WinAPI: SetWindowLong (<window-handle>, GWL_EXSTYLE, <new-style>). In one embodiment, <new-style> may be an existing windows style plus WS_EX_TRANSPARENT, WS_EX_NOACTIVATE, WS_EX_TOOLWINDOW. This technical solution provides the benefit that the generated window is completely transparent and that users of computing device 102 are able to click through it. In other words, if a button resides below the transparent window, and a user clicks on the button, then the click may be registered properly by text processing module 110A, 110B. Because of the aforementioned "click through" behavior, the programmatically generated window may be configured to listen to mouse move events, and, once the position of mouse is on top of markup like an underline, process 430 may be programmed to fire an event to highlight the underline or show an inline card or other graphical element. Moreover, visible control may be shown in the transparent window, if needed. Process 430 may be programmed with similar techniques for operating in a MAC OS or other operating system environment. In one embodiment, within the MAC OS context, the transparent window may be programmed with click through properties within the AppKit framework.

In one embodiment, process 430 is programmed to execute step 440 by causing executing, at client computing device 102, third programmed instructions formatted to cause receiving one or more character ranges respectively associated with one or more types of markup. A digital document undergoing composition at client computing device 102 may comprise a digital object with one or more characters. Each of these characters may be programmatically assigned a corresponding number by, for example, text processing module 110A, 110B or by another system component. Thus, in one embodiment, a character range may represent a numbered sequence or string of characters digitally representing natural language. As explained with more specificity herein, each of the checks 144A, 144B, 144C is programmed to execute a different form of checking or processing of a text change, including grammar checking, tone detection, or phrase checking. In one embodiment, the processing of one or more of these checks by text processor 140 may result in the generation of one or more forms of markup, which may be associated with one or more character ranges. For example, a tone check could identify a first character range (12-38) as representing a clause with inappropriate tone, while a phrase check identifies a second character range (89-111) as representing language wherein a phrase suggestion would be appropriate. In one embodiment, text processing module 110A, 110B may be programmed to associate each check with a type of markup, which may be the same type or a different type. Thus, in the given example, each of the first and second character ranges may be programmatically associated with underlining. Hence, in one embodiment, process 430 is programmed at step 440 to cause receiving, from text processor 140, one or more character ranges associated with one or more forms of markup resulting from one or more programmed checks 144A, 144B, 144C.

In one embodiment, process 430 is programmed to execute step 442 by causing executing, at client computing device 102, fourth programmed instructions formatted to cause determining one or more screen bounds corresponding to the one or more character ranges. In one embodiment, the fourth programmed instructions are formatted to cause receiving one or more bounding rectangles corresponding to the one or more character ranges by querying an accessibility API separately for each of the one or more character ranges. In one embodiment, when the character ranges span multiple lines, process 430 is programmed to divide the character ranges into disjoint sets of character ranges, one per line, and to execute an API call to receive the relevant character ranges one line at a time. Thus, in one embodiment, additional processing by text processing modules 110A, 110B results in a list of bounding rectangles per line.

In one embodiment, process 430 is programmed at step 442 to calculate only the position of markup which will be actually visible on device display 112 at process runtime. This technical solution reduces the number of API calls necessary to implement process 430, saving processing resources, processing time, network bandwidth, and other resources of computing device 102 and other system components, thereby improving the functioning of computing device 102. To accomplish this technical solution, when operating in a WINDOWS environment, in one embodiment, process 430 is programmed to call API method GetVisibleRanges of UIAutomation (TextPattern), which may return the overall text range visible on display device 112. However, some applications may not properly implement this API method. Therefore, another novel technical solution involves first executing programmed instructions implementing, for example, binary search to find a first and last visible underline by obtaining its coordinates and comparing with the visible bounds of the text control. Second, programmed instructions may be executed to cause calculating the visible bounds by programmatically obtaining and intersecting the visible bounds of all the parent controls, control by control. Process 430 may be programmed at step 442 to stop these calculations once the visible bounds are detected to be empty. In one embodiment, programmatically obtaining the visible bounds may comprise making one or more calls to an Accessibility API. Nevertheless, this additional technical solution also saves processing resources, processing time, network bandwidth, and other resources of computing device 102 and other system components, thereby improving the functioning of computing device 102 by reducing the number of API calls necessary to implement process 430.

In one embodiment, process 430 is programmed to execute step 444 by causing executing, at client computing device 102, fifth programmed instructions formatted to cause respectively displaying, in the transparent window, the one or more types of markup at the screen bounds corresponding to the one or more character ranges associated with that type of markup. Displaying markup may comprise, for example, rendering, in the transparent window, underlining, highlighting, a heatmap, shadow, background color, strikethrough, annotation, overlayed suggestions or other text, or another form of markup or visual augmentation of the text.

FIG. 4C illustrates a second example computer-implemented or programmed process for displaying markup in response to an inferred triggering event using a transparent window.

In one embodiment, a process 460 is programmed to begin execution at step 462 by causing executing, at computing device 102, first programmed instructions formatted to cause subscribing, by an application program executing on computing device 102, to a plurality of events provided by a first application programming interface. In one embodiment, the application program may be text processing module 110A, 110B. The application programming interface may be an accessibility API, as described with more specificity herein, or another API, such as a low-level API provided by operating system 104. In one embodiment, subscribing to an event such as a layout change event or a scroll event allows the programmed process implemented using text processing module 110A, 110B to infer that the text being displayed on display device 112 has changed—necessitating a change or repositioning in, for example, ML model output such as underlining or other markup. In one embodiment, "SendInput" may be used to make a change via a "low-level" Windows API, because UI AUTOMATION or IACCESSIBLE2 may not have the requisite functionality.

In one embodiment, process 460 is programmed to execute step 464 by receiving, by the application program, a Scroll Start event pushed from the first application programming interface. The Scroll Start event may be intentionally triggered by a user of client computing device 102, or it may be the result of computing device 102 executing control instructions provided by a browser 108 or other software executing on client computing device 102.

In one embodiment, the flow of execution of process 460 may subsequently dictate the execution of step 466. At step 406, responsive to receiving, by the application program, the Scroll Start event, process 400 may be programmed for executing second programmed instructions formatted to cause receiving, by the application program, one or more Scroll Wheel events respectively associated with one or more activations of a scroll wheel. In one embodiment, Scroll Wheel events may not be provided by an accessibility API, thus, after consuming a Scroll Start event, process 460 may be programmed to detect a Scroll Wheel event indicative of scrolling from another API or other source.

In one embodiment, process 460 is programmed to execute step 468 by causing executing, at client computing device 102, third programmed instructions formatted to cause processing the one or more Scroll Wheel events to determine a required displacement for one or more markup objects displayed in a transparent window of a currently focused element. In various embodiments, the markup displayed in the transparent window may be underlining, highlighting, a heatmap, shadow, background color, strikethrough, annotation, overlayed suggestions or other text, or another form of markup or visual augmentation. One or more of these types of markup may comprise a markup object rendered in the transparent window, such as an underline object. Process 460 may be programmed to determine the required displacement as a function of the amount of scrolling detected as input received from a user of computing device 102. In one embodiment, it may be assumed that scrolling linearly displaces each markup object by the same amount; hence, it may be enough to determine the required displacement of a single markup object and to apply that required displacement to all of the markup objects currently being rendered in the transparent window. As was described herein with more specificity in the description of step 442 (FIG. 4B) related to consuming a layout change event, process 460 may be programmed to determine, by executing programmed instructions formatted to implement binary search, that the one or more markup objects will be within a visual bounds after the one or more activations of the scroll wheel, and further to only calculate the required displacement/position of markup objects that will be within the visual bounds (screen bounds).

In one embodiment, process 460 is programmed to execute step 470 by causing executing, at the computer, fourth programmed instructions formatted to cause displaying, in the transparent window, the one or markup objects at one or more respective new screen bounds offset by the determined required displacement.

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field-programmable gate array (FPGA) that is persistently programmed to perform the techniques, or may include at least one general-purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
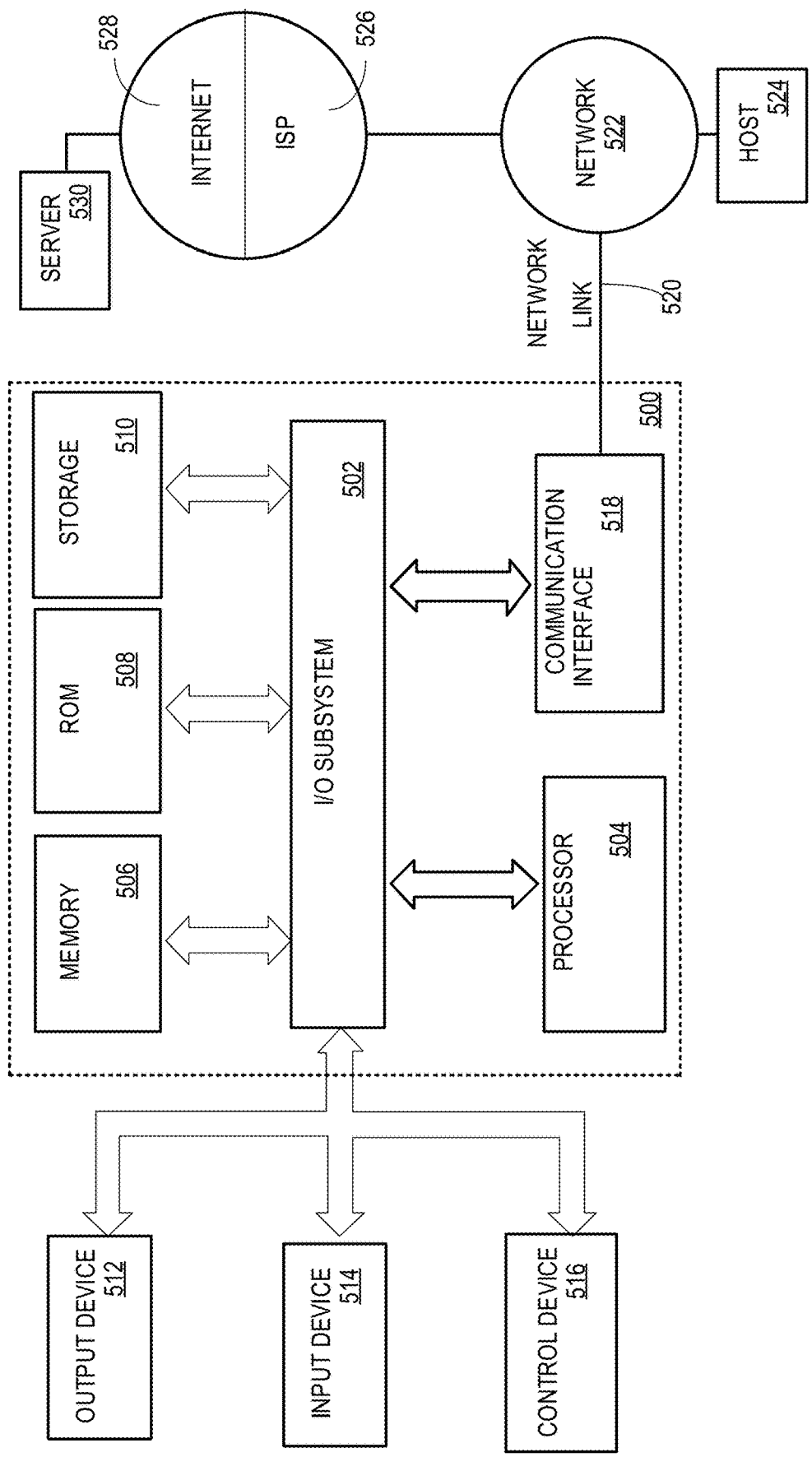
FIG. 5 illustrates a computer system with which one embodiment could be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanisms for communicating information and/or instructions between the components of the computer system 500 over electronic signal paths. The I/O subsystem 502 may include an I/O controller, a memory controller, and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or another dynamic storage device. Memory 506 also may be used for storing temporary variables or other intermediate information during the execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read-only memory (ROM) 508 or other static storage devices coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disks such as CD-ROM or DVD-ROM and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation layer, application layer, and data storage layer such as a relational database system using a structured query language (SQL) or no SQL, an object store, a graph database, a flat-file system, or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include another type (s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators, or servos.

At least one input device 514 is coupled to I/O subsystem 502 for communicating signals, data, command selections, or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism, or another type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware, and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware, and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid-state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 and place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to a network link(s) 520 that are directly or indirectly connected to at least one communication network, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 522 broadly represents a local area network (LAN), wide-area network (WAN), campus network, inter-network, or any combination thereof. Communication interface 518 may comprise a LAN card to provide a data communication connection to a compatible LAN or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic, or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a worldwide packet data communication network represented as internet 528. A server computer 530 may be coupled to internet 528. Server 530 broadly represents any computer, data center, virtual machine, or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm, or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer, and data storage layer such as a relational database system using a structured query language (SQL) or no SQL, an object store, a graph database, a flat-file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A computer-implemented method comprising:

causing executing, at a computer, first programmed instructions formatted to cause subscribing, by an application program executing on the computer, to a plurality of events provided by a first application programming interface;

receiving, by the application program, a layout change event pushed from the first application programming interface;

responsive to receiving the layout change event, determining, by the application program, that a change in focused element resulted in a currently focused element;

receiving, from the currently focused element, a digital electronic object comprising a source text;

programmatically dividing the source text into a plurality of source text units;

programmatically evaluating each particular source text unit among the plurality of source text units using a machine learning model, and receiving a classification output from the machine learning model that classifies each particular source text unit as a particular class of phrase among a plurality of possible classes of phrases;

programmatically transforming the classification output to yield an output set of phrase suggestions; and causing displaying, in a graphical user interface displayed on a device display of the computer, one or more phrase suggestions of the output set of phrase suggestions.

2. The computer-implemented method of claim 1, further comprising detecting the change in focused element by: querying a second application programming interface, receiving the currently focused element from the second application programming interface, and comparing the currently focused element to a previously focused element programmatically stored by the application program.

3. The computer-implemented method of claim 2, at least one of the first application programming interface or the second application programming interface being one of UI Automation, IAccessible2, or OS X Accessibility.

4. The computer-implemented method of claim 1, the plurality of source text units comprising a plurality of sentences of the source text.

5. The computer-implemented method of claim 1, the plurality of source text units comprising a plurality of sentences of the source text, the method further comprising executing the dividing using a computer-implemented parser.

6. The computer-implemented method of claim 1, the machine learning model comprising a trained multi-class text classifier comprising a FASTTEXT classifier.

7. The computer-implemented method of claim 1, the machine learning model comprising any of:
 a plurality of text classifiers coupled as an ensemble; or
 a plurality of targeted rules that are programmed to find relevant words and coupled to a classifier to approve or reject whether an instance of a word is correct.

8. The computer-implemented method of claim 6, the trained multi-class text classifier machine learning model being trained to classify each particular source text unit as a particular class of phrase from among: thank, happy birthday, ask for help, decline invitation, follow up, congratulate, introduce, apology, announcement, setting up a meeting.

9. The computer-implemented method of claim 1, the one or more phrase suggestions being displayed in a transparent window in the graphical user interface.

10. One or more computer-readable non-transitory storage media storing instructions operable when executed by one or more processors to cause performance of:
 causing executing, at a computer, first programmed instructions formatted to cause subscribing, by an application program executing on the computer, to a plurality of events provided by a first application programming interface;
 receiving, by the application program, a layout change event pushed from the first application programming interface;
 responsive to receiving the layout change event, determining, by the application program, that a change in focused element resulted in a currently focused element;
 receiving, from the currently focused element, a digital electronic object comprising a source text;
 programmatically dividing the source text into a plurality of source text units;
 programmatically evaluating each particular source text unit among the plurality of source text units using a machine learning model, and receiving a classification output from the machine learning model that classifies each particular source text unit as a particular class of phrase among a plurality of possible classes of phrases;
 programmatically transforming the classification output to yield an output set of phrase suggestions; and
 causing displaying, in a graphical user interface displayed on a device display of the computer, one or more phrase suggestions of the output set of phrase suggestions.

11. The one or more computer-readable non-transitory storage media of claim 10, the instructions further operable when executed to cause performance of detecting the change in focused element by: querying a second application programming interface, receiving the currently focused element from the second application programming interface, and comparing the currently focused element to a previously focused element programmatically stored by the application program.

12. The one or more computer-readable non-transitory storage media of claim 11, at least one of the first application programming interface or the second application programming interface being one of UI Automation, IAccessible2, or OS X Accessibility.

13. The one or more computer-readable non-transitory storage media of claim 10, the plurality of source text units comprising a plurality of sentences of the source text.

14. The one or more computer-readable non-transitory storage media of claim 10, the plurality of source text units comprising a plurality of sentences of the source text, the method further comprising executing the dividing using a computer-implemented parser.

15. The one or more computer-readable non-transitory storage media of claim 10, the machine learning model comprising a trained multi-class text classifier comprising a FASTTEXT classifier.

16. The one or more computer-readable non-transitory storage media of claim 10, the machine learning model comprising any of:
 a plurality of text classifiers coupled as an ensemble; or
 a plurality of targeted rules that are programmed to find relevant words and coupled to a classifier to approve or reject whether an instance of a word is correct.

17. The one or more computer-readable non-transitory storage media of claim 15, the trained multi-class text classifier machine learning model being trained to classify each particular source text unit as a particular class of phrase from among: thank, happy birthday, ask for help, decline invitation, follow up, congratulate, introduce, apology, announcement, setting up a meeting.

18. The one or more computer-readable non-transitory storage media of claim 10, the one or more phrase suggestions being displayed in a transparent window in the graphical user interface.

19. A system comprising:
 one or more processors; and
 one or more computer-readable non-transitory storage media coupled to one or more of the processors and storing instructions operable when executed by one or more of the processors to cause the system to perform operations comprising:
 causing executing, at a computer, first programmed instructions formatted to cause subscribing, by an application program executing on the computer, to a plurality of events provided by a first application programming interface;
 receiving, by the application program, a layout change event pushed from the first application programming interface;
 responsive to receiving the layout change event, determining, by the application program, that a change in focused element resulted in a currently focused element;
 receiving, from the currently focused element, a digital electronic object comprising a source text;
 programmatically dividing the source text into a plurality of source text units;

programmatically evaluating each particular source text unit among the plurality of source text units using a machine learning model, and receiving a classification output from the machine learning model that classifies each particular source text unit as a particular class of phrase among a plurality of possible classes of phrases;

programmatically transforming the classification output to yield an output set of phrase suggestions; and causing displaying, in a graphical user interface displayed on a device display of the computer, one or more phrase suggestions of the output set of phrase suggestions.

20. The system of claim 19, the instructions further operable when executed to cause performance of detecting the change in focused element by: querying a second application programming interface, receiving the currently focused element from the second application programming interface, and comparing the currently focused element to a previously focused element programmatically stored by the application program.

\* \* \* \* \*